United States Patent [19]

Sheng

[11] 3,787,757

[45] Jan. 22, 1974

[54] CIRCUIT FOR SUPPLYING REGULATED POWER UPON DEMAND

[75] Inventor: Abel Ching Nam Sheng, Morris Plains, N.J.

[73] Assignee: RCA Corporation, Princeton, N.J.

[22] Filed: Feb. 5, 1973

[21] Appl. No.: 329,618

[52] U.S. Cl. .................... 323/4, 58/23 BA, 320/54, 323/22 T
[51] Int. Cl. ............................ G05f 1/56, G05f 1/66
[58] Field of Search.. 58/23 BA, 28 R, 33; 307/297; 318/128, 132; 320/54; 323/1, 4, 16, 19, 22 T

[56] References Cited
UNITED STATES PATENTS

| | | | |
|---|---|---|---|
| 2,884,518 | 4/1959 | O'Neill | 320/54 X |
| 3,441,820 | 4/1969 | Heermans | 318/132 X |
| 3,500,103 | 3/1970 | Swain et al. | 318/132 X |
| 3,524,125 | 8/1970 | Berger et al. | 323/22 T |

Primary Examiner—A. D. Pellinen
Attorney, Agent, or Firm—H. Christoffersen; Samuel Cohen

[57] ABSTRACT

A load circuit requires regulated power during relatively short, relatively widely spaced, time intervals. In the absence of a demand for power, a control circuit drawing infinitesimal quiescent current inactivates a regulator circuit connected to the load circuit. When there is a demand for regulated power, the regulator circuit senses this demand and turns on and the control circuit senses a flow of current to the load circuit and in response thereto, locks the regulator in its "on" condition.

30 Claims, 1 Drawing Figure

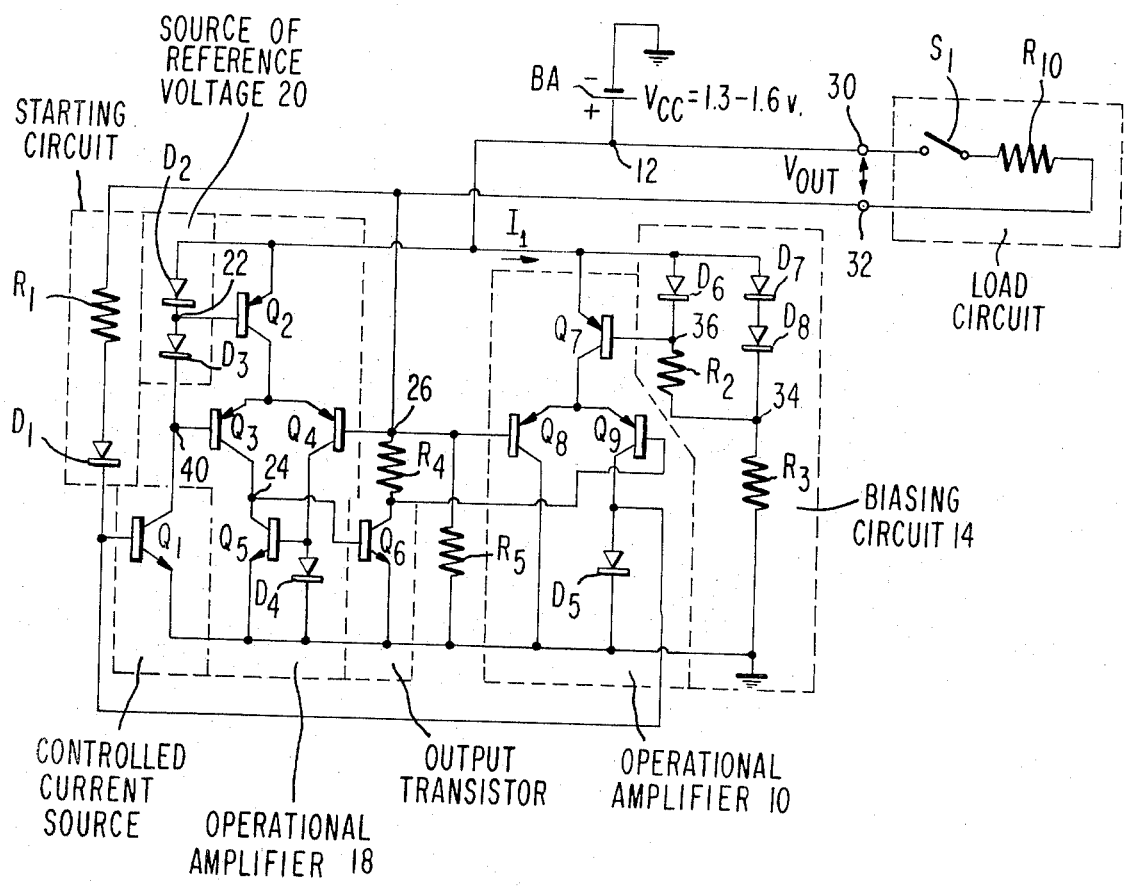

CIRCUIT FOR SUPPLYING REGULATED POWER UPON DEMAND

The requirement for power in certain small electronic instruments, such as in some forms of electronic timepieces, is periodic, and at a low duty cycle. In one particular application, for example, operating voltages are needed only 1/60th of each incremental time period. During the active portion of each incremental time period, it is a normal requirement that the voltage and current supplied to the instruments be well-regulated despite changes in the voltage supplied by the primary source of operating energy. In some such portable instruments, the primary source of energy to supply the power demanded by the instruments is a battery with relatively limited storage capability, such as a very small, single cell battery and it is necessary that this battery last for a relatively long time (generally at least a year or so). It is therefore important that during the quiescent portion of each incremental time period, the power supply circuit extract very little energy from the battery.

In the circuit of an embodiment of the invention, when the load circuit requires no external power, a high impedance control circuit, which draws very little current, maintains a regulator circuit inactive. When the load circuit requires power, the regulator initially is turned on in response, for example, to the closing of a switch in the load circuit and the high impedance control circuit, in response to the start of current through the load, maintains the regulator circuit in its operating condition.

The invention is illustrated in the single FIGURE making up the drawing, which FIGURE is a schematic circuit diagram of an embodiment of the invention.

The supply circuit shown in the FIGURE comprises a first operational amplifier 10 connected at one terminal to the positive terminal of battery BA. The negative terminal of this battery is connected to a point of reference potential such as ground. The operational amplifier includes three PNP transistors $Q_7$, $Q_8$ and $Q_9$ and a diode $D_5$. Transistor $Q_7$ is connected at its emitter to the positive terminal 12 of the power supply and at its collector to the emitters of transistors $Q_8$ and $Q_9$. The collector of transistor $Q_8$ is connected to ground and the collector of transistor $Q_9$ is connected through diode $D_5$ to ground. The operational amplifier 10 has a built-in offset in the sense that transistor $Q_8$ has a larger base-emitter junction area than transistor $Q_9$ so that all other things being equal, transistor $Q_8$ tends to conduct more readily than transistor $Q_9$. This larger base-emitter junction may be obtained in the manufacturing process or, for example, by employing two transistors in parallel for transistor $Q_8$.

The biasing circuit 14 for operational amplifier 10 comprises three diodes $D_6$, $D_7$ and $D_8$ and two resistors $R_2$ and $R_3$. Diodes $D_7$ and $D_8$ are connected essentially in series with resistor $R_3$. Diode $D_6$ is connected essentially in series with resistor $R_2$ and this series circuit is connected across diodes $D_7$ and $D_8$. The resistor values are very high so that the biasing circuit draws little current as will be discussed in more detail below. The relative geometries of transistor $Q_7$ and diode $D_6$ connected in parallel with the emitter-base junction of $Q_7$ are such that the current through the emitter-to-collector path of transistor $Q_7$ is equal to the current conducted by diode $D_6$. Here and elsewhere the diode may be a transistor connected to operate as a diode as is now common in integrated circuit technology so that its characteristics are similar to that of the emitter-base junction of a transistor.

The starting circuit (shown at the left) for the regulator portion of the supply circuit comprises resistor $R_1$ in series with diode $D_1$. As will be discussed shortly, when switch $S_1$ of the load circuit is open, no current flows in this path.

The regulator includes an operational amplifier 18 which comprises three PNP transistors, $Q_2$, $Q_3$ and $Q_4$, an NPN transistor Q5, and a diode $D_4$. Transistor $Q_2$ is connected at its emitter to the positive terminal 12 of the battery BA and at its collector to the joined emitters of transistors $Q_3$ and $Q_4$. The collector of transistor $Q_3$ is connected through the collector-to-emitter path of NPN transistor $Q_5$ to ground and the collector of transistor $Q_4$ is connected to the base of transistor $Q_5$ and through diode $D_4$ to ground.

The source of reference voltage 20 for the operational amplifier 18 comprises the two series-connected diodes $D_2$ and $D_3$. The base of transistor $Q_2$ is connected to the node 22 between these diodes. The cathode of diode $D_3$ is connected to the base of transistor $Q_3$ and is connected through the collector-to-emitter path of NPN transistor $Q_1$ to ground. The function of transistor $Q_1$ is to operate as a constant current device during the intervals it is on, as will be discussed shortly.

The supply circuit also includes an output NPN transistor $Q_6$ which is connected at its base to the node 24 at the joined collectors of the transistors $Q_3$ and $Q_5$. The collector of transistor $Q_6$ is connected through resistor $R_4$ to the connection 26 at the bases of transistors $Q_4$ and $Q_8$, and the emitter of transistor $Q_6$ is connected to ground. The collector of transistor $Q_6$ is also connected to the base of transistor $Q_9$. The interconnected base electrodes of transistors $Q_4$ and $Q_8$ are connected through resistor $R_5$ to ground.

The load circuit driven by the supply circuit is connected across terminals 30 and 32. This load circuit comprises a switch $S_1$ which is normally open and an electrical circuit illustrated as a load resistor $R_{10}$. In one particular application, the load $R_{10}$ comprised the escapement motor for a timepiece which periodically operated the switch $S_1$. However, in other applications the load can take some other form and the switch $S_1$ may be either a mechanical switch periodically operated by mechanical means, or an electronic switch periodically operated either by an electrical circuit or by electromechanical means. In either case, the switch may be closed for a very short interval of time relative to the time it is open. In one particular circuit, the switch is closed 1/60th of each incremental time interval and is open the remaining portion of each incremental time period. In this application, the switch was closed for about 8 milliseconds each 480 milliseconds.

In the operation of the circuit described above, when the switch $S_1$ is open, terminal 32 is at ground potential. It is connected to ground through resistor $R_5$. Terminal 30 is at the potential of the battery BA, which may be somewhere between 1.3 and 1.6 volts, depending upon such parameters as the age of the battery.

Terminal 12 of the battery BA is connected through diodes $D_7$ and $D_8$ and resistor $R_3$ to ground. Resistor $R_3$ has a high resistance such that this circuit conducts an infinitesimal amount of current while establishing a reference voltage at node 34. A portion of this current is conducted through diode $D_6$ and resistor $R_2$ and establishes a second reference voltage at terminal 36. The voltages at nodes 34 and 36 ($V_{34}$ and $V_{36}$, respectively) referred to $V_{CC}$ are relatively fixed voltages because of the regulating action of the diodes across which they are developed. Typical values may be $V_{34}=1.2$ volts and $V_{36}=0.5$ volts, in each case with respect to $V_{CC}$, that is, with respect to the voltage at battery terminal 12. $R_3$ has a high resistance (2 megohms in one design) and $R_2$ an even higher resistance (10 megohms in that design). The diode $D_6$ operates in the region of the knee of its characteristic and its dynamic resistance is relatively high. Current flow through the branch $D_6$, $R_2$ is relatively small. Current flowing in the emitter-to-collector path of transistor $Q_7$ is substantially equal to that through diode $D_6$ and is of the order of 80 nanoamperes$=80 \times 10^{-9}$ amperes in one particular design.

When switch $S_1$ is open, terminal 32 and the bases of transistors $Q_8$ and $Q_9$ are all substantially at ground potential. Substantially no current flows either through resistor $R_4$ or through resistor $R_5$ for this condition, but resistor $R_5$ provides a path to ground. As previously mentioned, operational amplifier 10 has a built-in offset voltage. Therefore, the constant current flowing in the emitter-to-collector path of transistor $Q_7$ tends to flow mainly into transistor $Q_8$. In practice, the amount of offset is such that substantially all of this current flows into transistor $Q_8$ and substantially none flows through transistor $Q_9$ and diode $D_5$. Thus, no voltage develops across diode $D_5$ and transistor $Q_1$ is maintained in an "off" condition as its base and emitter ×at the same potential. As transistor $Q_1$ does not conduct, diodes $D_2$ and $D_3$ do not conduct and as terminal 32 is at ground potential, no current flows through resistor $R_1$ or diode $D_1$. As diodes $D_2$ and $D_3$ do not conduct, none of the elements of operational amplifier 18 conducts and the output transistor $Q_6$ also does not conduct.

In one practical circuit, when switch $S_1$ is open, the total quiescent current $I_1$ which flows from the battery, that is, the current passing through the various conducting branches of the biasing circuit 14 plus the current to the operational amplifier 10 totals 0.95 microamperes (less than $1 \times 10^{-6}$ amperes).

When the switch $S_1$ closes, the voltage at terminal 12 instantaneously appears at terminal 32 (assuming no current flow for this brief instant). The voltage at terminal 32 now causes current to flow through resistor $R_1$ and diode $D_1$ (the starting circuit) and into the base-emitter junction of transistor $Q_1$. This turns transistor $Q_1$ on. This, in turn, permits current to flow from battery terminal 12 through diodes $D_2$ and $D_3$, and the voltage thereby produced at node 22 causes constant current transistor $Q_2$ to go on. At this instant, the base of transistor $Q_3$ is at a certain voltage determined by the regulating action of diodes $D_2$ and $D_3$ and the base of transistor $Q_4$ is at a certain voltage due to the path from battery terminal 12 through switch $S_1$ and load $R_{10}$ to node 26. The current of transistor $Q_2$ therefore flows, in part, through transistor $Q_3$ and transistor $Q_5$ to ground, and flows, in part, through transistor $Q_4$ and diode $D_4$ to ground.

The voltage at node 24 now causes base current to flow in output transistor $Q_6$ turning that transistor on. The load current through $R_{10}$ now flows through resistor $R_4$ and the collector-to-emitter path of transistor $Q_6$. This flow of current through resistor $R_4$ causes the base of transistor $Q_9$ to become less positive than the base of transistor $Q_8$, changing the state of the operational amplifier 10. The constant collector current of transistor $Q_7$ now switches from transistor $Q_8$ to the emitter-to-collector path of transistor $Q_9$ and through the diode $D_5$ to ground. The voltage thereby established across diode $D_5$ now latches the transistors $Q_1$ into the "on" condition.

In more detail, the constant current of transistor $Q_7$ passes mainly into diode $D_5$; however, a small portion of this current flows also through the emitter-to-base diode of transistor $Q_1$. Resistor $R_1$ is now essentially out of the circuit as the voltage at terminal 32 is relatively low compared to that across diode $D_5$. In one particular design, the area of the base-emitter junction of transistor $Q_1$ is made three times as large as that of the junction of diode $D_5$. Therefore, the collector current of transistor $Q_1$ (which is a constant current during the time $Q_1$ is on) is three times the constant collector current of transistor $Q_7$. This collector current of transistor $Q_1$ flows through the diodes $D_2$ and $D_3$ and now establishes a direct reference voltage at node 40 relative to $V_{CC}$. This reference voltage (a constant voltage relative to $V_{CC}$) serves as the reference level for the operational amplifier 18 and is applied to the base of transistor $Q_3$.

The function of the operational amplifier 18 is to compare the reference voltage at node 40 with the voltage at node 26. The voltage present at node 26 is a function of the amount of current passing through the load $R_{10}$. This load current passes mainly through resistor $R_4$ and transistor $Q_6$ (and a small amount also passes through resistor $R_5$) and establishes a voltage at node 26. When this voltage tends to change from one having a predetermined relationship with the reference level established by the voltage at node 40, that is, when the two become unequal, the relative currents drawn through transistors $Q_3$ and $Q_4$ change as does the voltage at node 24. The change in the value of the voltage at point 24 changes the amount of current that transistor $Q_6$ draws and this, in turn, changes the amount of load current. The change is always in a sense to return the voltage at node 26 to equality with the reference level at 40, all relative to $V_{CC}$. That is, the circuit maintains the voltage difference between $V_{CC}$ and node 26 equal to the voltage difference between $V_{CC}$ and node 40. The latter voltage difference is regulated by the diodes $D_2$, $D_3$ and the former voltage is that applied to the load circuit $R_{10}$. Thus the load circuit $R_{10}$ has a regulated voltage applied thereto.

To give a specific example of this regulator action, when the current through the load tends to decrease and voltage at node 26 tends to increase (becomes more positive) relative to the voltage at node 40, transistor $Q_3$ starts to draw more collector current than transistor $Q_4$. As transistor $Q_5$ and diode $D_4$ draw equal currents, the extra current flowing through transistor $Q_3$ flows into the base-emitter junction of transistor $Q_6$. This causes the current flow to the load $R_{10}$ to increase and the voltage at node 26 to become less positive, the process continuing until $V_{CC}$ minus the voltage at 26 again becomes equal to $V_{CC}$ minus the voltage at node 40.

Summarizing the operation discussed above, output terminal 30, which is tied to the battery terminal 12, is maintained at the battery voltage $V_{CC}$ of say 1.6 volts.

This battery voltage, via the network $D_2$, $D_3$, $Q_1$, causes a fixed reference voltage relative to $V_{CC}$ to be established at node 40 when the switch $S_1$ is closed. The operational amplifier 18 controls the output transistor $Q_6$ and the latter regulates the load current to maintain the voltage at node 26 equal to the reference voltage at node 40. Thus, the voltage at terminal 32 is held at a substantially fixed offset from the voltage at terminal 30 even if the voltage at terminal 30 should change (as a result of battery aging, for example). In one particular design, this offset voltage-the output voltage $V_{out}$, is held to approximately 1.04 to 1.06 volts, over the entire battery operating range 1.3–1.6 volts. Thus, output voltage $V_{out}$ is substantially constant value (to within 2 percent or so) and the output current, which is regulated to achieve this voltage value, is also regulated to a substantially constant value. In the particular design discussed above, this output current during the time the switch $S_1$ is closed, is approximately 735 microamperes.

A typical circuit according to the invention may be completely integrated. In this form of the circuit, the diodes may be transistors connected to operate as diodes and the resistors may be transistors connected to operate as resistors or semiconductor junctions doped to the level required for a particular value of resistance. In one particular circuit, given by way of example, the resistance values were:

$R_1$ = 10 Kilohms
$R_2$ = 10 Megohms
$R_3$ = 2 Megohms
$R_4$ = 25 Ohms
$R_5$ = 50 Kilohms
$R_{10}$ = 1.5 Kilohms In this particular circuit, operated at approximately 25° C, the output voltages obtained at various input voltages were as shown in the table below.

| Vcc (volts) | Vout (volts) | Vcc-voltage at node 40 |
|---|---|---|
| 1.3 | 1.041 | 1.052 |
| 1.4 | 1.054 | 1.054 |
| 1.5 | 1.056 | 1.056 |
| 1.6 | 1.058 | 1.058 |

What is claimed is:

1. For use with a load circuit having a pair of input terminals which, during some periods of operation, are electrically connected, and during others are electrically open, a supply circuit comprising:
   first and second output terminals, the first for connection to one terminal of a voltage source whose other terminal is for connection to a point of reference voltage, said first output terminal also for connection to one of said input terminals and said second output terminal for connection to the other of said input terminals;
   a control circuit connected between said first output terminal and said point of reference voltage, and responsive to the current flowing from said second output terminal for producing a disabling control voltage in response to the absence of a flow of current from said second output terminal and for producing a maintaining control voltage in response to the presence of such a flow of current; and
   a regulator circuit for producing a relatively constant output voltage over a relatively wide range of variation of the voltage produced by said voltage source, when said regulator circuit is in its operating condition, said regulator circuit coupled to and controlled by said control circuit, responsive to the presence of a voltage at said second output terminal for switching from a disabled to an operating condition and responsive to said maintaining voltage produced by said control circuit for being held in said operating condition, said regulator circuit coupled between said output terminals and said point of reference voltage for maintaining a substantially constant voltage difference between said output terminals when said regulator circuit is in its operating condition.

2. For use with a load circuit having a pair of input terminals which, during some periods of operation, are electrically connected, and during others are electrically open, a supply circuit comprising:
   first and second output terminals, the first for connection to one terminal of a voltage source whose other terminal is for connection to a point of reference voltage, said first output terminal also for connection to one of said input terminals and said second output terminal for connection to the other of said input terminals;
   a control circuit connected between said first output terminal and said point of reference voltage, and responsive to the current flowing from said second output terminal, for producing a disabling control voltage in response to the absence of a flow of current from said second output terminal and for producing a maintaining control voltage in response to the presence of such a flow of current, said control circuit comprising a voltage divider, which includes diode means, said voltage divider connected between said first output terminal and said point of reference voltage for establishing a bias voltage, and an operational amplifier including a current source referenced to this bias voltage for producing a current at a relatively low level, a pair of transistors connected to conduct the current from said source, and means causing one of said transistors to conduct substantially all of said current; and
   a regulator circuit coupled to and controlled by said control circuit, responsive to the presence of a voltage at said second output terminal for switching from a disabled to an operating condition and responsive to said maintaining voltage produced by said control circuit for being held in said operating condition, said regulator circuit coupled between said output terminals and said point of reference voltage for maintaining a substantially constant voltage difference between said output terminals when said regulator circuit is in its operating condition.

3. A supply circuit as set forth in claim 24, wherein the portion of said control circuit responsive to the presence of a flow of current from said second output terminal comprises means for switching the state of said operational amplifier for causing the other transistor of said operational amplifier to conduct substantially all of said current.

4. A supply circuit as set forth in claim 3 wherein the portion of said control circuit for producing a maintaining control voltage comprises means responsive to current flow through said other transistor for producing an output voltage.

5. For use with a load circuit having a pair of input terminals which, during some periods of operation, are electrically connected, and during others are electrically open, a supply circuit comprising:

first and second output terminals, the first for connection to one terminal of a voltage source whose other terminal is for connection to a point of reference voltage, said first output terminal also for connection to one of said input terminals and said second output terminal for connection to the other of said input terminals;

a control circuit connected between said first output terminal and said point of reference voltage, and responsive to the current flowing from said second output terminal, for producing a disabling control voltage in response to the absence of a flow of current from said second output terminal and for producing a maintaining control voltage in response to the presence of such a flow of current; and a regulator circuit coupled to and controlled by said control circuit, responsive to the presence of a voltage at said second output terminal for switching from a disabled to an operating condition and responsive to said maintaining voltage produced by said control circuit for being held in said operating condition, said regulator circuit coupled between said output terminals and said point of reference voltage for maintaining a substantially constant voltage difference between said output terminals when said regulator circuit is in its operating condition, said regulator circuit comprising:

an operational amplifier connected between said first output terminal and said point of reference voltage, said amplifier including a current source and first and second transistors for conducting the current from said source;

a reference voltage circuit connected between said first output terminal and said point of reference voltage, including means responsive to current flow through said reference voltage circuit for establishing a bias level for said current source, means responsive to said current flow for establishing a voltage level on the control electrode of the first transistor, and a normally off third transistor for preventing the flow of current through said reference voltage circuit; and a starting circuit comprising means responsive to a voltage at said second output terminal for turning on said normally off transistor, said second output terminal being connected also to the control electrode of the second transistor of said operational amplifier.

6. A supply circuit as set forth in claim 25, further including current control means coupled between said point of reference voltage and the control electrode of said second transistor and controlled by said operational amplifier.

7. A supply circuit as set forth in claim 6, further including means responsive to the flow of current through said current control means for controlling said control circuit.

8. A supply circuit as set forth in claim 7, further including a connection from said control circuit to said control electrode of said normally off transistor of said reference voltage circuit.

9. A circuit for supplying regulated power to a load circuit which demands power for relatively short, relatively widely spaced intervals comprising, in combination:

a control circuit coupled to said load circuit drawing relatively little current in the absence of a demand for power for producing a disabling signal in the absence of such demand and for producing a maintaining signal in the presence of such demand; and a regulator circuit coupled to said control circuit and manitained disabled by said disabling signal in the absence of a demand for power, and coupled to said load circuit and responsive to a demand for power, for being placed in an operative condition, to thereby regulate the power applied to said load circuit, said control circuit supplying said maintaining signal to said regulator circuit for maintaining it in its operative condition in response to said demand for power, said regulator circuit comprising connections for a voltage source, means responsive to the voltage provided at said connections by said voltage source for producing a relatively fixed reference voltage level at a fraction of the value of said source voltage, and means including a voltage comparison circuit for producing an output voltage at this relatively fixed level over a relatively wide range of variation of said source voltage.

10. A circuit as set forth in claim 9 in which said means for producing a relatively fixed reference voltage level comprises reference voltage establishing means connected essentially in series with switch means, said switch means being responsive to said disabling signal for opening to thereby prevent the production of said fixed reference voltage level and being responsive to said maintaining signal for being held in a closed condition to thereby prevent the production of said fixed reference voltage level and being responsive to said maintaining signal for being held in a closed condition to thereby permit the production of said fixed reference voltage level.

11. A circuit as set forth in claim 10 wherein said switch means comprises a transistor having a control electrode and a conduction path, said conduction path connected essentially in series with said reference voltage establishing means, and said control electrode being connected to receive said disabling and maintaining signals.

12. A circuit as set forth in claim 11, further including means responsive to said demand for power connected to said control electrode, for initially placing said conduction path in a low impedance condition in response to said demand for power.

13. A circuit as set forth in claim 10, wherein said reference voltage establishing means comprises diode means.

14. A circuit for supplying power to a load circuit which includes a normally open switch comprising, in combination:

a first output terminal connectable to said load circuit to which one terminal of an operating voltage source may be connected:

a high impedance circuit connected between that terminal and a reference terminal to which the other terminal of said operating voltage circuit may be connected, said high impedance circuit for producing a turn off voltage when said switch is open and responsive to current flow through said switch, when said switch is closed, for producing a maintaining voltage;

a regulator circuit, responsive to the voltage produced by said high impedance circuit, connected between said first output terminal and said reference terminal for producing a relatively constant output voltage when turned on, over a relatively wide range of values of the voltage produced by said operating voltage source;

a second output terminal connectable to said load circuit; and means responsive to the presence of a voltage at that second terminal for turning on said regulator circuit and for concurrently changing the condition of said high impedance circuit causing it to produce said maintaining voltage, whereby said regulator circuit maintains said second output terminal at a given voltage relative to the voltage at said first output terminal.

15. In combination:

a first operational amplifier including a current source, and first and second current paths connected in parallel between said source and a point of reference potential, said second path including a diode;

a second operational amplifier including a current source, and a pair of current paths connected in parallel between said source and said point of reference potential, each such path including the conduction path of an amplifier and each amplifier including a control electrode; and a transistor having base, emitter and collector electrodes, connected at its collector electrode to one of said control electrodes of said second operational amplifier and having its emitter-base junction connected across said diode.

16. In the combination as set forth in claim 11, said first operational amplifier including means for quiescently causing the current from its source to flow substantially entirely into said first path, and further including means for changing the state of said first operational amplifier comprising means for shifting said current flow into said second path.

17. In the combination as set forth in claim 15, further including a control current path connected at one terminal to said collector electrode and having a second terminal for connection to an operating voltage source.

18. In the combination as set forth in claim 17, further including reference voltage establishing means in said control current path for placing said collector electrode of said transistor at a voltage level differing by a fixed amount from that of said operating voltage source.

19. In the combination as set forth in claim 18, said reference voltage establishing means comprising a pair of diodes connected in series in the forward direction, and further including a connection from the point in said series circuit between the two diodes to said current source of said second operational amplifier for establishing the level at which current flows in said second operational amplifier.

20. In combination:

a first operational amplifier including a current source, and first and second current paths connected in parallel between said source and a point of reference potential, said second path including a diode connected at one electrode to said point of reference potential;

a second operational amplifier including a current source, and a pair of current paths connected in parallel between said source and said point of reference potential, each such path including the conduction path of an amplifier and each amplifier including a control electrode; and a transistor having base emitter and collector electrodes, connected at its collector electrode to one of said control electrodes of said second operational amplifier and at its emitter electrode to said point of reference potential, and the base-emitter junction of said transistor connected across said diode.

21. In the combination as set forth in claim 20, said first and second current paths of said first operational amplifier each comprising the emitter-to-collector path of a respective one of two transistors, the two emitters connected to one another and to said current source of said first operational amplifier, one collector connected through said diode to said point of reference potential and said other collector connected to said point of reference potential.

22. In the combination as set forth in claim 21, said two transistors of said first operational amplifier each having a base electrode, further including resistor means connecting said base electrodes, means connected to one of said base electrodes for quiescently biasing both transistors in the forward direction, and said transistors having geometries such that when they are equally forward biased, the one connected to said diode conducts none of the current supplied by the current source of said first operational amplifier and the other transistor conducts substantially all of this current.

23. In the combination as set forth in claim 21, said pair of current paths of said second operational amplifier comprising the emitter-to-collector paths of two transistors, respectively, the two emitters connected to one another and to said current source of said second operational amplifier, and further including means connecting both collectors to said point of reference potential.

24. In the combination as set forth in claim 23, said control electrodes comprising base electrodes, said second operational amplifier connected at one base electrode to one base electrode of said first operational amplifier and to a point in the circuit at which a voltage to be regulated periodically is present, and said second operational amplifier connected at its other base electrode to a circuit point at which a reference voltage level periodically is present.

25. In the combination as set forth in claim 24, further including a load circuit connected to the point in said circuit at which a voltage to be regulated periodically appears, the current through said load circuit establishing the voltage at said point, and amplifier means connected to and controlled by said second operational amplifier connected between said point in said circuit and a point of reference potential for supplying said current through said load circuit.

26. A circuit for supplying power to a load circuit comprising, in combination:

first, second, third and fourth transistors of a first conductivity type and fifth and sixth transistors of a second conductivity type, each of said transistors having a base, an emitter, and a collector electrode;

means for connecting said first and said second transistors in a first emitter coupled amplifier configuration having an input circuit including their base-emitter paths and having an output circuit including the collector-emitter path of said second transistor;

means for connecting said third and said fourth transistors in a second emitter-coupled amplifier configuration having an input circuit including their base-emitter paths and having an output circuit including the collector-emitter path of said fourth transistor;

means for connecting said fifth transistor in a first common-emitter amplifier configuration with its base electrode direct coupled to the output circuit of said first emitter-coupled amplifier and with its collector electrode direct coupled to the input circuit of said second emitter-coupled amplifier configuration;

means for connecting said sixth tranxistor in a second common-emitter amplifier configuration with its base electrode direct coupled to the output circuit of said second emitter coupled amplifier configuration and with its collector electrode direct coupled to said load circuit; and means for sensing the amount of power applied to said load circuit to provide a control signal direct coupled to said input circuit of said first emitter-coupled amplifier.

27. In the combination set forth in claim 26, means for controlling the combined emitter currents of said third and said fourth transistors in response to collector current of said fifth transistor; and means providing a path for starting current to the emitter electrodes of said third and said fourth transistors in response to said load circuit coming conductive.

28. A circuit for supplying regulated power at a relatively fixed level to a load circuit which demands power for relatively short, relatively widely spaced intervals in spite of variations in the voltage provided by the voltage source powering said circuit comprising, in combination:

a control circuit coupled to said load circuit drawing relatively little current in the absence of a demand for power for producing a disabling signal in the absence of such demand and for producing a maintaining signal in the presence of such demand, said circuit including voltage divider means for connection across said voltage source and having an impedance in the megohm range, diode means forming part of said voltage divider means for producing a relatively constant output voltage in response to current flow through said voltage divider means, a constant current source responsive to said relatively constant output voltage level for producing a constant current at a relatively low level, a pair of current paths, means for causing said current to flow in one of said paths in the absence of said demand for power and for switching said current into the other of said paths in response to the presence of said demand for power, and means in said other path responsive to the absence of current flow in said other path for producing said disabling signal and responsive to the presence of said current flow for producing said maintaining signal; and a regulator circuit coupled to said control circuit and maintained disabled by said disabling signal in the absence of a demand for power, and coupled to said load circuit and responsive to a demand for power, for being placed in an operative condition, to thereby regulate the power applied to said load circuit to a relatively constant value, and said control circuit supplying said maintaining signal to said regulator circuit for maintaining it in its operative condition in response to said demand for power.

29. A circuit as set forth in claim 28 wherein said means in said other path responsive to current flow in said other path comprises diode means connected to conduct said current in the forward direction.

30. A circuit as set forth in claim 28 wherein said regulator circuit includes a transistor having a base-emitter junction, said diode means being connected across said base-emitter junction for causing current flow therein in response to a voltage developed across said diode means.

* * * * *

UNITED STATES PATENT OFFICE
CERTIFICATE OF CORRECTION

Patent No. 3,787,757　　　　　　　　　　Dated January 22, 1974

Inventor(s) Abel Ching Nam Sheng

It is certified that error appears in the above-identified patent and that said Letters Patent are hereby corrected as shown below:

Column 6, line 54, change "24" to --2--.

Column 7, line 51, change "25" to --5--.

Signed and sealed this 13th day of August 1974.

(SEAL)
Attest:

McCOY M. GIBSON, JR.　　　　　C. MARSHALL DANN
Attesting Officer　　　　　　　Commissioner of Patents